United States Patent [19]

Tsuru

[11] Patent Number: 5,403,643
[45] Date of Patent: Apr. 4, 1995

[54] METALLIC CORE OF RUBBER TRACK

[75] Inventor: Eiji Tsuru, Yokohama, Japan

[73] Assignee: Bridgestone Corporation, Tokyo, Japan

[21] Appl. No.: 903,966

[22] Filed: Jun. 26, 1992

[30] Foreign Application Priority Data

Jul. 3, 1991 [JP] Japan .................................. 3-190806
Jul. 3, 1991 [JP] Japan .................................. 3-190807

[51] Int. Cl.⁶ .................... B32B 3/00; B62D 55/00
[52] U.S. Cl. ...................................... 428/120; 305/38; 305/56; 305/57
[58] Field of Search .................... 428/120; 305/35 EB, 305/39, 38, 57, 56

[56] References Cited

FOREIGN PATENT DOCUMENTS 0118912 9/1984 European Pat. Off. .
0304390 2/1989 European Pat. Off. .
0428725 5/1991 European Pat. Off. .

Primary Examiner—Alexander S. Thomas
Attorney, Agent, or Firm—Sughrue, Mion, Zinn, Macpeak & Seas

[57] ABSTRACT

A metallic core for a rubber track includes wing portions to be embedded in an elastic member of the rubber track, an engaging portion at the center of the core for engaging a driving sprocket, and a pair of protrusions provided on both sides of the engaging portion and projecting from the inner circumferential surface of the rubber track. Each of the protrusions is provided with at least one extension extending in the longitudinal direction of the rubber track, and the top surfaces at the extension and at the center of the protrusion for rolling an idler thereon are connected to each other with a surface gently inclined downward toward the center of the protrusion, thereby maintaining idlers rolling on the metallic cores of a rubber track at a substantially constant level without upward and downward movements. The protrusions may be formed with shoulders along their longitudinal directions and in symmetry with each other to form upper top surfaces which are flat for an upper idler and lower top surfaces for a lower idler, the lower top surfaces at the extensions are higher than those at the centers of the protrusions.

19 Claims, 11 Drawing Sheets

FIG_1
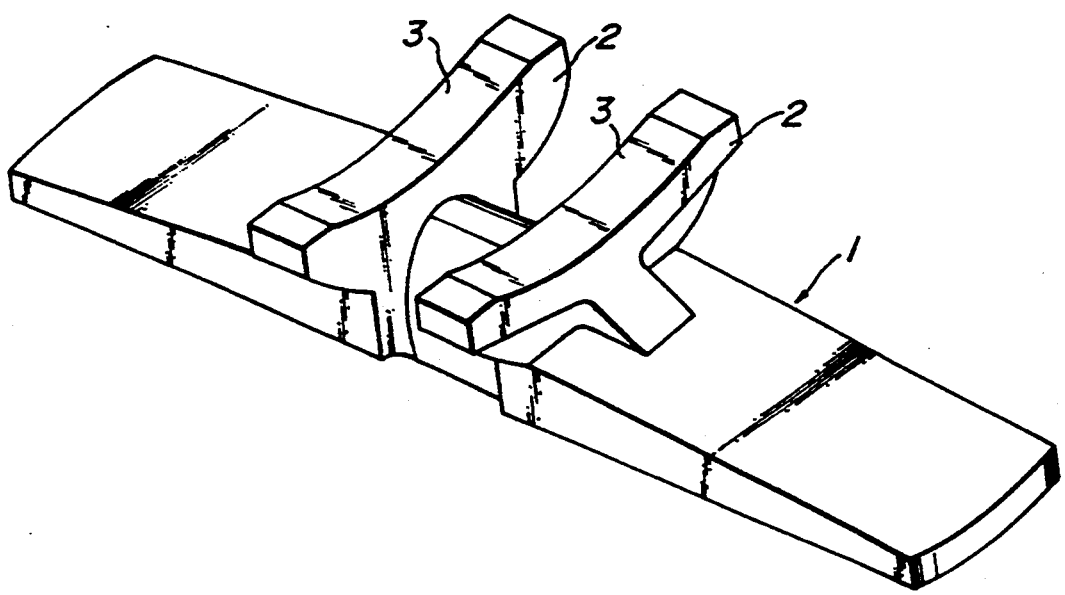
FIG_2
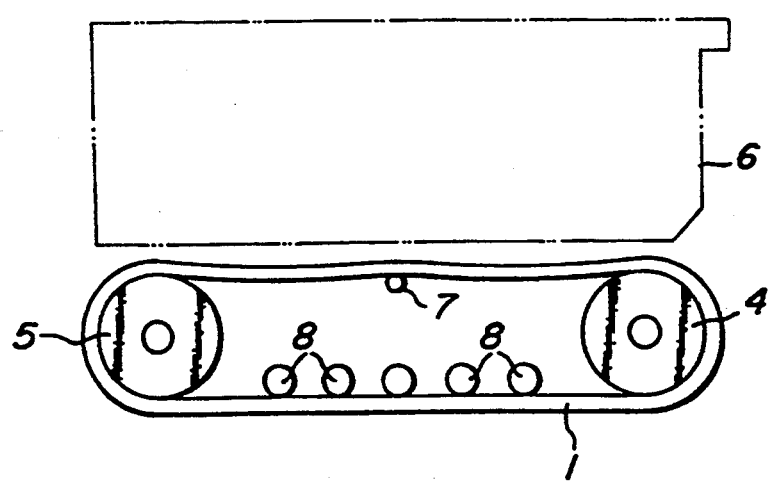

FIG_6
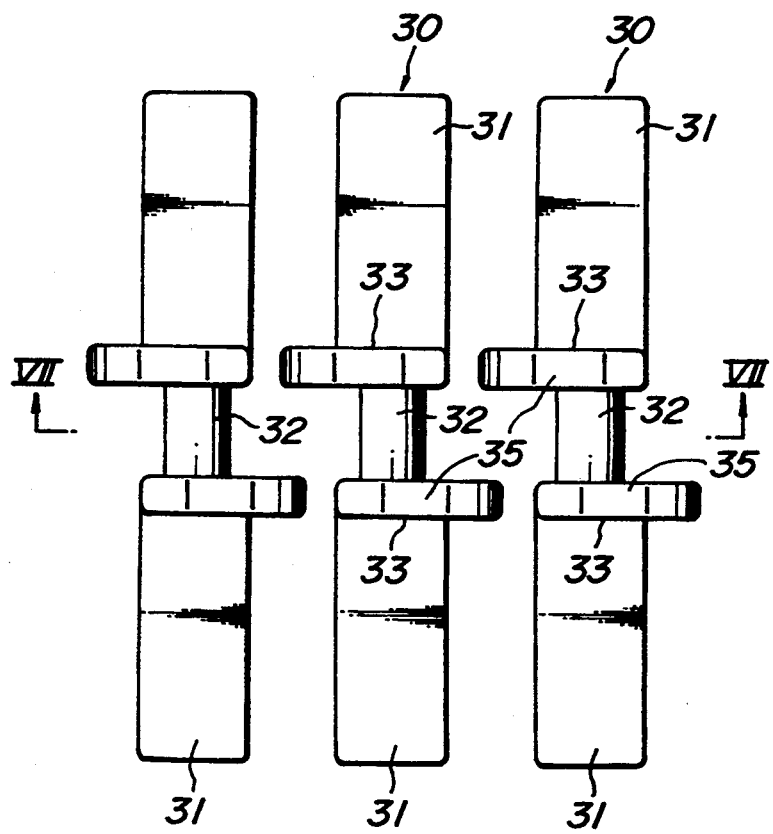
FIG_7
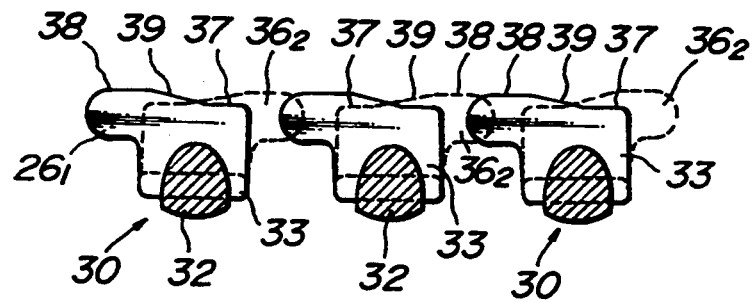

FIG_14

FIG_17
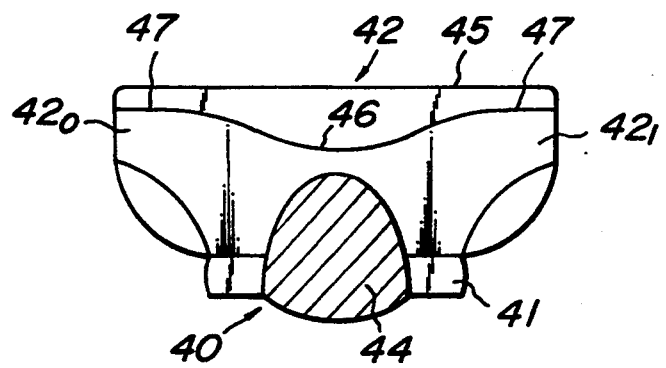
FIG_18
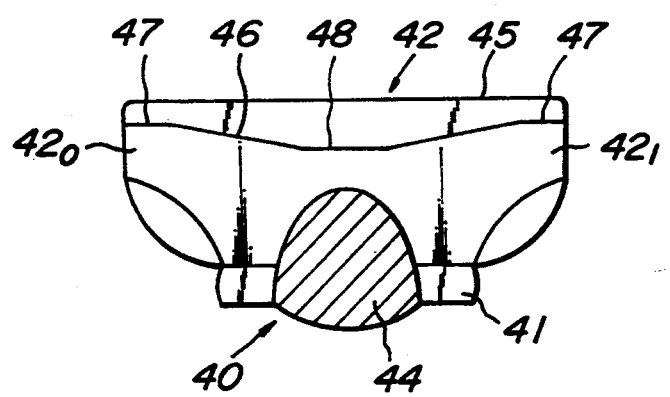
FIG_19
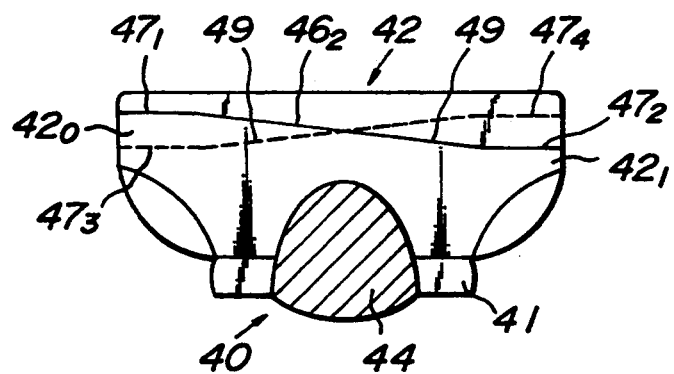

FIG_20
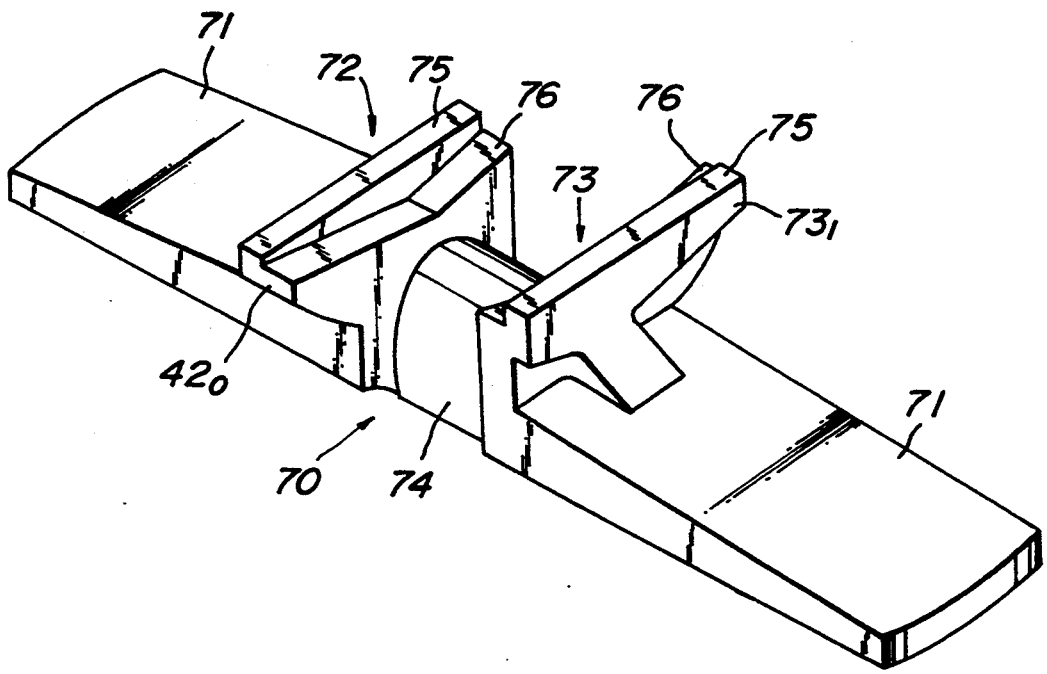
FIG_21
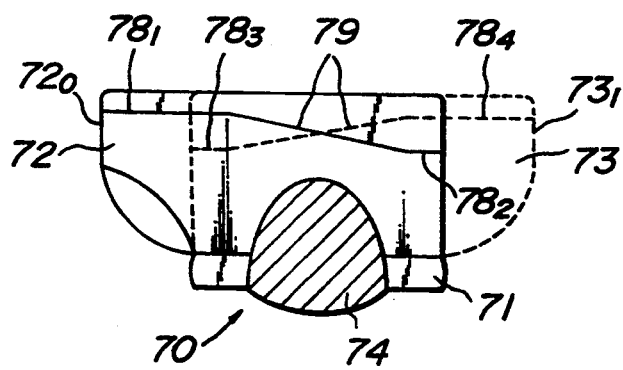

FIG_22
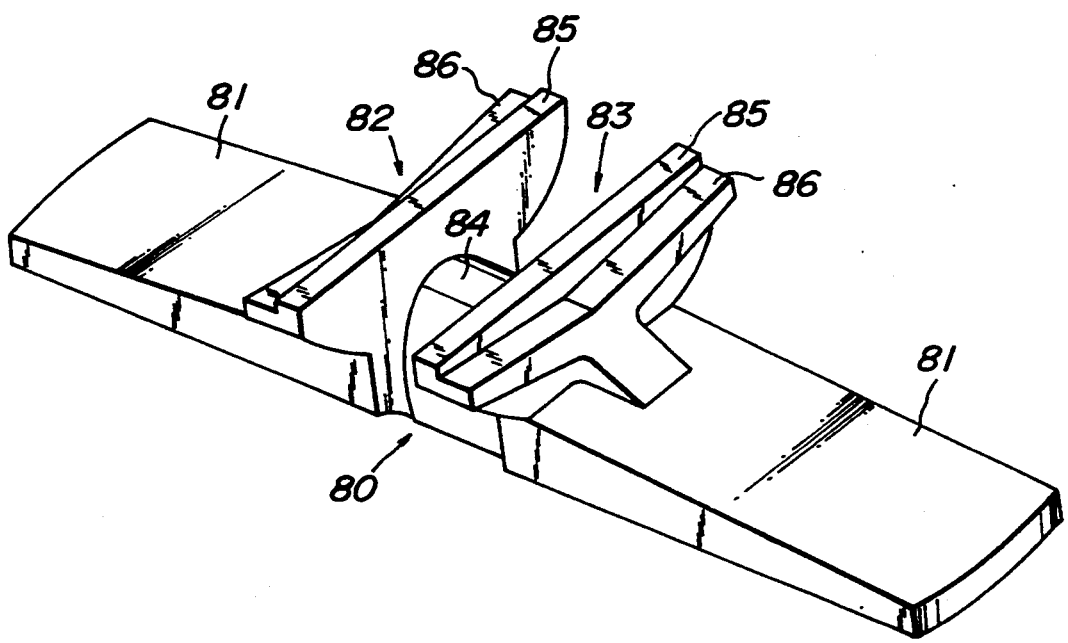

METALLIC CORE OF RUBBER TRACK

BACKGROUND OF THE INVENTION

This invention relates to a metallic core of a rubber track used for moving construction machinery and construction working machinery.

Recently rubber tracks have been progressively widely used for agricultural machinery as well as construction machinery and construction working machinery in place of iron shoe tracks which had been used as traveling devices for construction machinery and construction working machinery.

In general, the rubber track includes an endless belt-shaped rubber-like elastic member, a number of metallic cores embedded therein and aligned in the longitudinal direction thereof and extending in traverse directions thereof, and steel cords (tension-resistant members) embedded in the endless elastic member to surround the metallic cores circumferentially outwardly. As such rubber tracks are made of rubber-like materials, vibrations transmitted to personnel are mitigated and paved roads are not damaged. Therefore, rubber tracks have been used widely.

In recent years, particularly, large type rubber tracks have been developed for use in construction machinery. It is often required to use such rubber tracks in substitution for iron shoe tracks for construction machinery which has been equipped with iron shoe tracks. In order to fulfill the requirement, therefore, the rubber tracks have a particular configuration and various attempts have been made especially in metallic cores embedded in rubber tracks. In general, a number of metallic cores are embedded in a rubber track with constant intervals, and the metallic cores are provided with protrusions projecting into the inside of the rubber track for rolling on lower idlers of the machinery.

On the other hand, the machinery body of several tons is supported by the ten or more lower idlers so that they are subjected to a heavy weight. With this construction, therefore, the metallic cores rock about their longitudinal axes due to the weight every time the lower idlers have just ridden on the protrusions of the metallic cores and transferred onto adjacent metallic cores. As a result, the lower idlers are repeatedly raised and lowered at the metallic cores and between the metallic cores as a whole, so that vibrations are transmitted to a personnel on the machinery due to the upward and downward movement of the lower idlers.

In view of this, a metallic core 1 as shown in FIG. 1 has been proposed, whose protrusions 2 have curved top surfaces 3 depressed at their centers, on which the lower idlers roll. This construction is intended to mitigate the vibrations by reducing the difference between the rocking movements of the metallic cores about their axes and the vertical movements of the lower idlers.

As shown in a traveling device or a vehicle in FIG. 2, however, the rubber track extends around a driving wheel 4 and an idler 5 to be driven by the driving wheel 4. The upper part of the rubber track moving on the side of the vehicle body 6 is supported by upper idlers 7 mounted on the vehicle body 6. However, the upper idlers 7 are generally metallic rollers which support the metallic cores 1 embedded in the rubber track by contacting the top surfaces 3 of the protrusions 2 of the metallic cores 1.

Therefore, if the top surfaces 3 of the protrusions 2 are concave as described above, the upper idlers repeatedly collide directly against the ends of the protrusions 2 to produce annoying noise and cause damage to the protrusions or the upper idlers as the case may be. This failure results from the concave top surfaces 3 of the protrusions 2 taking into consideration only the contact with the lower idlers 8 without taking into account the upper idlers 7. In this case, the ends of the upper surfaces 3 of the protrusions 2 aid in increasing the violence of collision of the metallic cores 1 against the upper idlers 7.

Another example of metallic cores of a rubber track hitherto used for construction machinery and the like is shown in a plan view of FIG. 3 and a sectional view of FIG. 4. In these drawings, the metallic core has wing portions 11 to be embedded in a rubber-like elastomer and an engaging portion 12 adapted to engage teeth of a sprocket as a driving wheel. The engaging portion 12 is generally rounded so as to match the teeth of the sprocket and in the form of an inverted-U whose cross-sectional area is narrower than that of the wing portions 11. The metallic core is formed with a pair of protrusions 13 extending from the inner surface of the rubber track and on both sides of the engaging portion 12.

The protrusions 13 serve to prevent the metallic core from removing from an idler 14 provided on the construction machinery, and the top surfaces 15 of the protrusions 13 form traveling surfaces on which the idler 14 rolls. In general, the protrusions 13 are provided with extensions 16 further projecting from the wing portions 11 in longitudinal directions of the rubber track. The top surfaces 17 of the extensions 16 are gently inclined surfaces. The top surfaces 17 may be flat which are flush with the top surfaces 15 of the protrusions 13.

In the metallic cores 11 shown in FIGS. 3 and 4, when the idler 14 arrives at the position A or begins to ride on the top surfaces of the protrusions 13, while rolling on the upper surfaces 15 of the protrusions 13, the weight of the machinery acts on the extensions 16, in the form of a cantilever of the protrusions 13. It is unavoidable for the metallic core to tilt (shown in dot-and-dash lines) in the direction shown by an arrow X in FIG. 4. At this moment, the idler 14 tends to sink somewhat, while tilting together with the metallic core. When the idler 14 arrives at the position B or at the center of the upper surfaces 15 of the protrusions 13, the idler 14 returns to its original level. When the idler 14 arrives at position C or on the extensions 162, the metallic core tilts (shown in two-dot-and-dash lines) in the direction shown by an arrow Y due to the weight of the machinery in the same manner as at the point A, and the idler 14 again sinks.

The above phenomenon is summarized as follows. The idler 14 rolls on the metallic cores, while moving upwardly and downwardly and hence vibrations always occur which are transmitted to personnel. The prevention of the vibrations has been an urgent problem.

Moreover, even if all the top surfaces of a metallic cores are flat, the sinking of the idler could not be avoided. In this case, furthermore, when the idler transfers from the upper surfaces of one metallic core to those of the adjacent metallic core, it is impossible to avoid a collision of the idler against the ends of the extensions of the metallic core. Therefore, strange sounds and additional vibrations are produced by such collisions.

A further example of hitherto used metallic cores is shown in a plan view of FIG. 5, wherein the metallic core is formed with extensions 26 of protrusions 23 projecting from wing portions 11, one extension 26 in one longitudinal direction of a rubber track and the other extension 26 in the opposite direction thereto. In this example, the top surfaces of the protrusions 23 may be gently inclined as shown in FIG. 4 or they may be flat. With this construction, the idler (not shown) preferably continuously rolls alternately on the top surfaces 25 on both sides of the metallic cores. However, there still is the sinking of the idler and the collision of the idler against the extensions 26 of the protrusions 23. Therefore, it is still required to prevent vibrations caused by sinking and collision.

As can be seen from the above explanation, in the large type rubber tracks used in large type construction working machinery such as bulldozers and power shovels, metallic cores tend to tilt about their axes when the idler passes on the metallic cores. The repeated tilting of the cores cause vibrations troublesome to personnel and give rise to cracks in rubber track made of an elastomer and damaging thereof, thereby considerably shortening the service life of the rubber track.

SUMMARY OF THE INVENTION

It is a principal object of the invention to provide an improved metallic core of a rubber track, which eliminates all the disadvantages of the prior art and is substantially free from repeated tilting thereof so that vibrations are prevented to improve the durability of the rubber track.

In order to accomplish this object, in a metallic core for a rubber track including wing portions extending on both sides of the core and to be embedded in an elastic member of the rubber track in width directions thereof, a sprocket engaging portion at the center of the core for engaging a driving sprocket, and a pair of protrusions provided on both sides of the sprocket engaging portion and projecting from the inner circumferential surface of the rubber track, according to the invention each of the protrusions is provided with at least one extension extending in the longitudinal direction of the rubber track, and the top surfaces at the extension and at the center of the protrusion for rolling an idler thereon are connected to each other with a surface gently inclined downward toward the center of the protrusion.

In a preferred embodiment, the protrusions are provided with extensions, respectively, extending in the longitudinal directions opposite to each other and the top surfaces at the extensions and at the centers of the protrusions are flat surfaces and the inclined surfaces are also flat surfaces or smoothly curved surfaces.

The top surfaces at the extensions are preferably higher than the top surfaces at the centers of the protrusions substantially by a sunk distance of an idler rolling on the protrusions due to the weight of a vehicle. The invention is more advantageously applicable to metallic cores having extensions extending alternately in opposite directions capable of providing continuous rolling surfaces for idlers.

The invention resides in the discovery that an idler rolling on metallic cores of a rubber track can be maintained at a substantially constant level without upward and downward movements by previously lowering the rolling surfaces at the centers of the metallic cores corresponding to the sunk distance of the idler which has just ridden on the extensions of the protrusions of the metallic cores.

In the prior art, an idler is sunk at the extensions of protrusions, returned to the initial level at the center of the protrusions and again sunk when leaving the protrusions so that the idler repeatedly undergoes upward and downward movements when rolling on the metallic cores.

In contrast herewith, according to the invention the rolling surfaces at the centers of the protrusions are previously lowered by a distance corresponding to the sunk distance of the idler so that the idler rolls on the metallic cores at the substantially constant level.

In general, the difference in height between the top surfaces of the extensions and the centers of the protrusions are preferably of the order of 1 to 5 mm although it depends upon weights of vehicles and numbers of idlers.

In a further embodiment of the invention, the protrusions are provided on both the ends with extensions, and said protrusions are formed with shoulders along their longitudinal directions and in symmetry with each other to form upper top surfaces which are flat for an upper idler and lower top surfaces for a lower idler, the lower top surfaces at the extensions are higher than those at the centers of the protrusions.

According to this embodiment the upper top surfaces are flat rolling surfaces so that upper idlers smoothly contact the upper surfaces. It is therefore possible to eliminate vibrations and strange sounds due to metal-to-metal contact at these portions and to drive the rubber track without upward and downward movements. The upper top surfaces may be provided with extensions in the lower top surfaces or may be devoid of extensions as the case may be.

The lower top surfaces are rolling surfaces for lower idlers and comprise the features described above for maintaining the lower idler rolling on the metallic cores at the substantially constant level.

The invention will be more fully understood by referring to the following detailed specification and claims taken in connection with the appended drawings.

BRIEF DESCRIPTION OF THE DRAWINGS

FIG. 1 is a perspective view illustrating a metallic core;

FIG. 2 is a front elevation of a vehicle equipped with rubber tracks;

FIG. 6 is a plan view of metallic cores according to the invention;

FIG. 7 is a sectional view of the metallic cores taken along the line VII—VII in FIG. 6;

FIG. 17 is a sectional view of a metallic core of the eighth embodiment according to the invention;

FIG. 18 is a sectional view of a metallic core of the ninth embodiment according to the invention;

FIG. 19 is a sectional view of a metallic core of the tenth embodiment according to the invention;

FIG. 20 is a perspective view of a metallic core of the eleventh embodiment according to the invention;

FIG. 21 is a sectional view of a metallic core of the twelfth embodiment according to the invention; and FIG. 22 is a perspective view of a metallic core of the thirteenth embodiment according to the invention.

DESCRIPTION OF THE PREFERRED EMBODIMENTS

Figure 3:
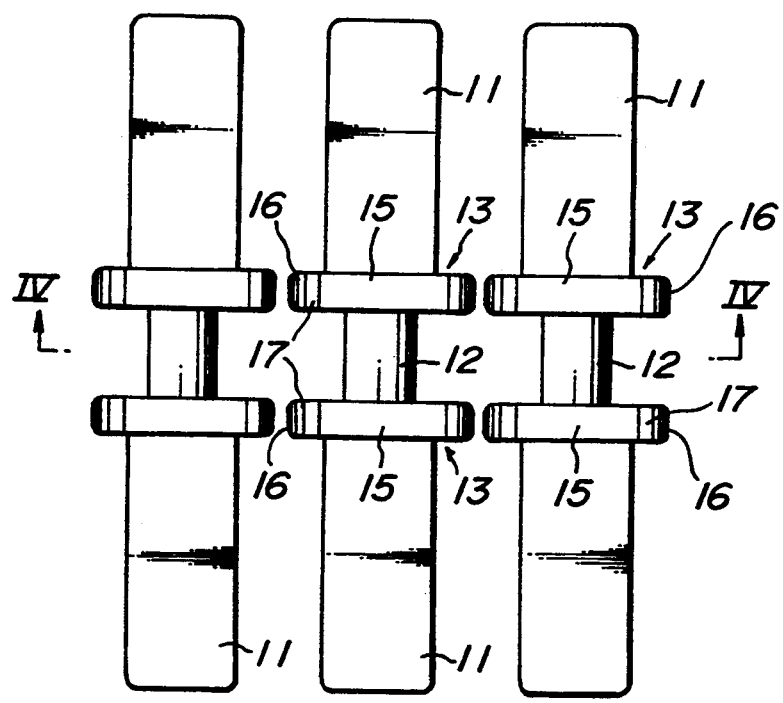
FIG. 3 is a plan view illustrating another example of metallic cores of the prior art.
Figure 4:
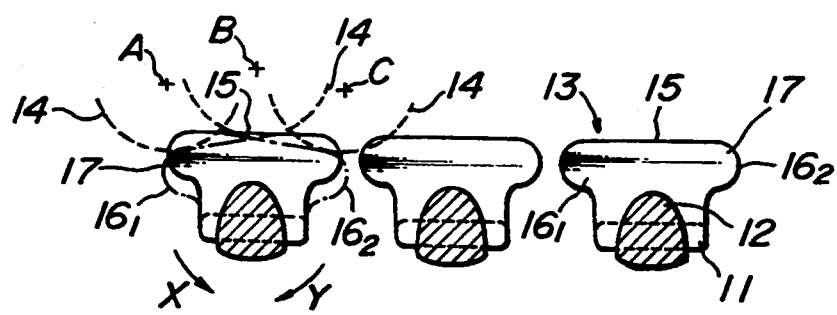
FIG. 4 is a sectional view of the cores taken along the line IV—IV in FIG. 3.
Figure 5:
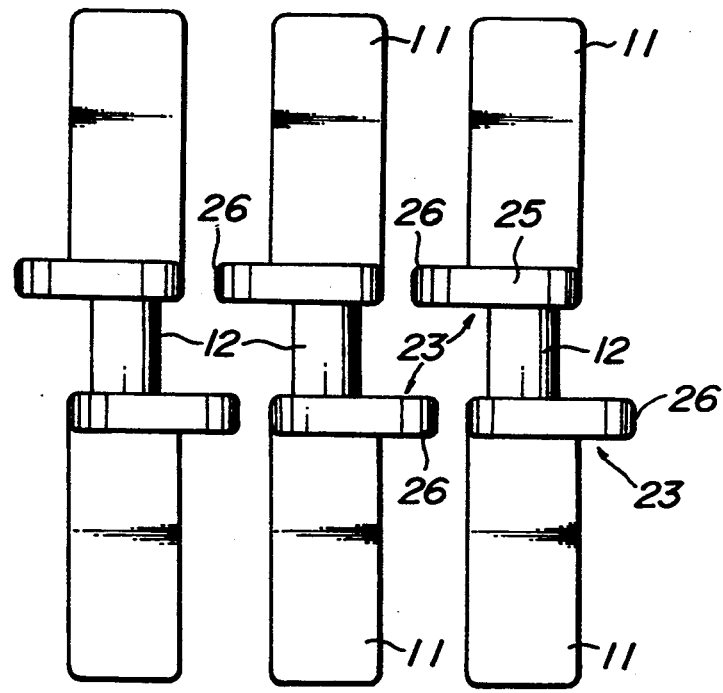
FIG. 5 is a plan view illustrating a further example of metallic cores of the prior art.

FIGS. 6 and 7 illustrate metallic cores of the first embodiment according to the invention. The metallic core includes wing portions 31 to be embedded in the rubber elastomer of a rubber track. An engaging portion 32 is integrally formed at the center of the metallic core, and a pair of protrusions 33 are provided on both the sides of the engaging portion 32 and having top surfaces 35 on which idlers 34 roll. The protrusions 33 include extensions 361 and 362 extending beyond the wing portions 31 in opposite directions, respectively. Each of the protrusions 33 has a flat surface 37 at the center and a flat surface 38 at the extension 361 or 362, the former being higher by D (FIG. 8) than the latter, and a gently inclined flat surface 39 connecting the flat surfaces 37 and 38. The difference D between the flat surfaces 37 and 38 is substantially equal to the sunk distance of the idlers.

Figure 8:
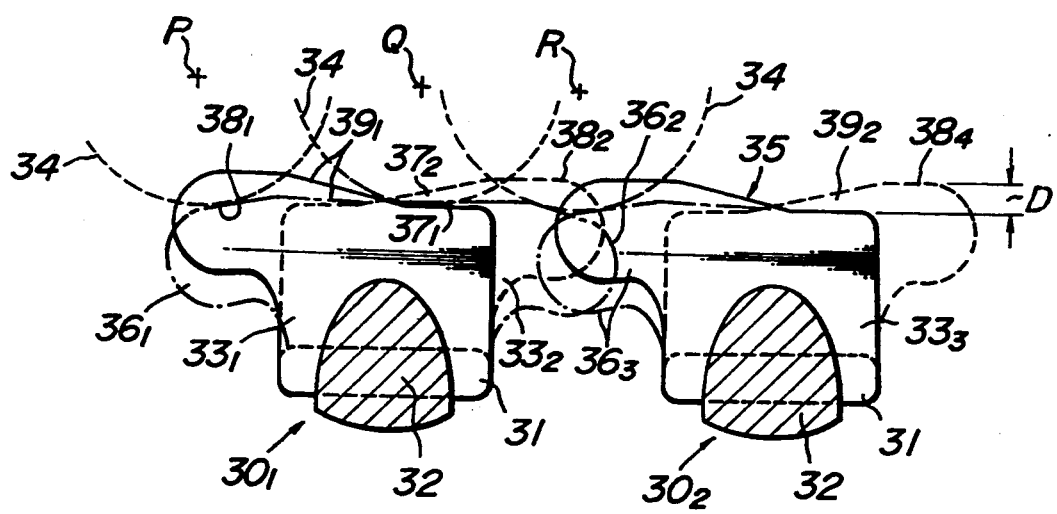
FIG. 8 is a schematic view illustrating the relation between the metallic cores shown in FIG. 6 and an idler rolling thereon.

FIG. 8 schematically illustrates the relation between the metallic cores 30 according to the embodiment and the idler 34 rolling thereon. When the idler 34 has arrived at the position P to ride on the top surface 381 of the protrusion 331 of the metallic core 301, the top surface 381 of the extension 361 of the protrusion 331 is inclined due to the weight of a vehicle. The idler 34 then rolls on the inclined surface 391 to the top surface 371 at the center of the protrusion 331. Because the top surface 371 at the center is at a lower level by the sunk distance of the idler 34 than the top surface 381 at extension 361, the idler 34 does not move vertically. At the moment, the idler 34 has already ridden on the top surface 372 at the center of the other protrusion 332 of the core 301.

When the idler 34 is in position R or about to leave the metallic core 301 and ride on the top surface of the protrusion 333 of the adjacent metallic core 302, the extension 362 is tilted and the idler 34 then rolls on the inclined surface 392 to arrive at the flat top surface 382 of the extension 362. In this case, the idler 34 does not move substantially vertically. At the moment, the idler 34 has already ridden on the top surface 383 of the extension 363 of the protrusion 333 of the metallic core 302. Thereafter, the idler 34 rolls on the top surfaces 35 of the protrusions 33 in the same manner without vertical movement.

Figure 9:
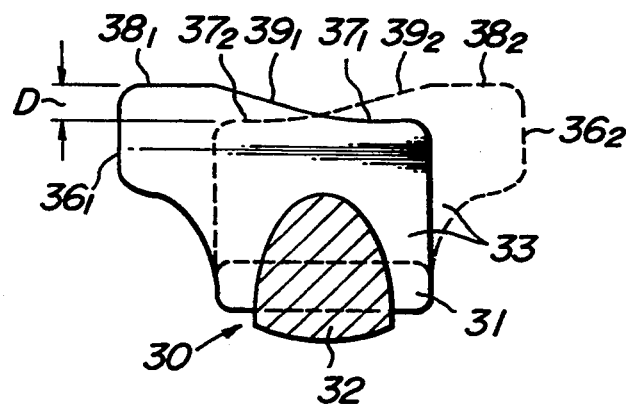
FIG. 9 is a sectional view of a metallic core of the second embodiment according to the invention.
Figure 10:
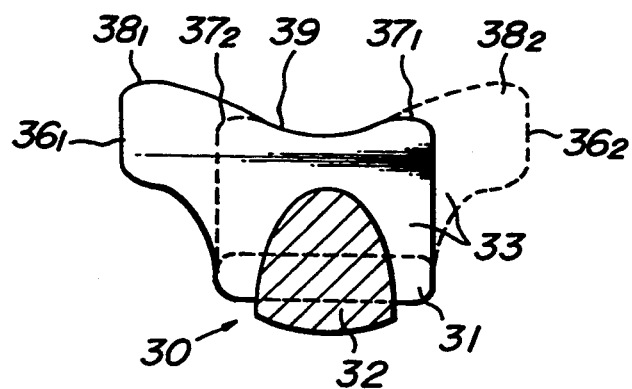
FIG. 10 is a sectional view of a metallic core of the third embodiment according to the invention.

FIG. 9 illustrates the second embodiment of the invention wherein the inclined surface 39 connecting the flat surfaces 37 and 38 is slightly curved. Moreover, FIG. 10 shows the third embodiment of the invention wherein the top surfaces 38 and 37 at the extensions and the centers of protrusions 33 are flat surfaces and connected by concaved surfaces. The smooth rolling of idlers are ensured to the metallic cores according to these embodiments.

Figure 11:
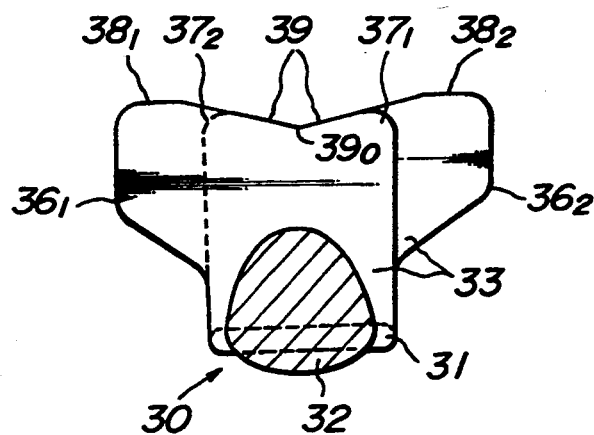
FIG. 11 is a sectional view of a metallic core of the fourth embodiment according to the invention.
Figure 12:
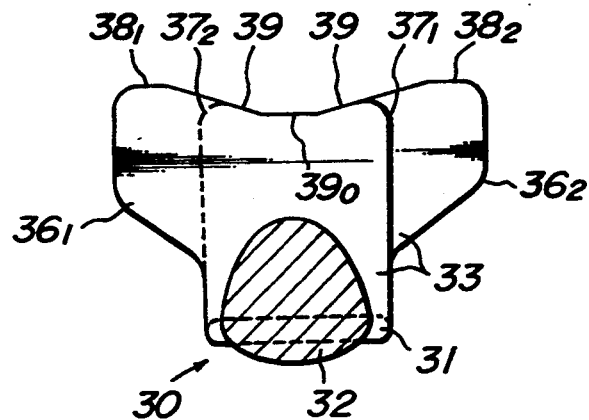
FIG. 12 is a sectional view of a metallic core of the fifth embodiment according to the invention.
Figure 13:
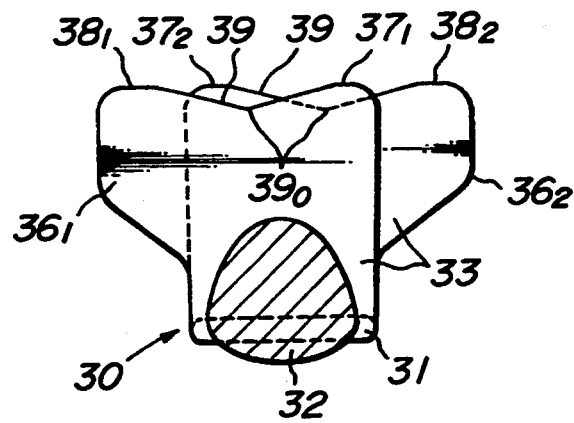
FIG. 13 is a sectional view of a metallic core of the sixth embodiment according to the invention.

In the metallic core 30 of the fourth embodiment shown in FIG. 11 similar to that of FIG. 10, inclined surfaces 39 of the two protrusions of the core adjacent the flat top surfaces 37 and 38 are connected by V-shaped flat surfaces 390 which ensure the smooth rolling of idlers. This metallic core 30 does not have flat surfaces at the center of protrusions. With the metallic core 30 of the fifth embodiment shown in FIG. 12, the top surfaces 38 and 37 at the extensions and at the centers of the protrusions are connected by V-shaped flat surfaces 39 having flat bottoms 390. In the metallic core of the sixth embodiment shown in FIG. 13, the metallic core 30 shown in FIG. 11 is modified to shift somewhat the V-shaped surfaces of the protrusions relative to each other. These metallic cores also ensure the smooth rolling of idlers.

As can be seen from the above description, according to the invention vibrations due to upward and downward movements of the idlers rolling on metallic cores are effectively prevented by successfully modifying the configuration of rolling surfaces of the metallic cores to eliminate the uncomfortableness of personnel due to vibrations during working and traveling of the vehicle equipped with rubber tracks. The invention can provide metallic cores capable of considerably reducing fatigue of the personnel on the vehicle working for a long time.

Figure 14:
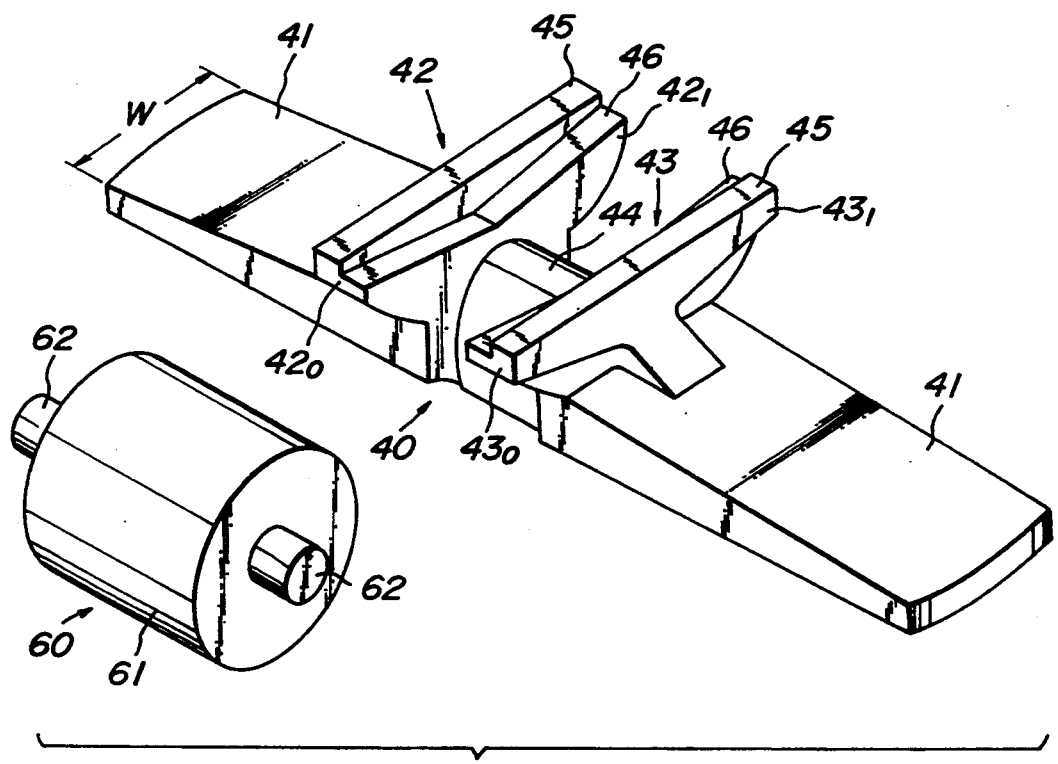
FIG. 14 is a perspective view of a metallic core of the seventh embodiment according to the invention.

FIG. 14 illustrates in a perspective view a metallic core of the seventh embodiment of the invention. The metallic core includes wing portions 41 extending on both the sides, a pair of protrusions 42 and 43 formed at the center of the core, and a sprocket engaging portion 44 formed between the protrusions 42 and 43. Each of the protrusions 42 and 43 extends beyond the width W of the core to form extensions 420 and 421 or 430 and 431.

Each of the protrusions 42 and 43 is formed with shoulders on the side of the sprocket engaging portion 44 to form an upper top surface 45 on the outer side and lower top surfaces 46 on the inner side. The upper top surfaces 45 of the protrusions 42 and 43 are rolling surfaces for an upper idler 7 and flat except chamfered portions. On the other hand, the lower top surfaces 46 are rolling surfaces for lower idlers 60. The lower idler 60 consists of a large diameter portion 61 and small diameter portions 62 which rolls on the lower top surfaces 46 of the metallic core. The lower top surfaces 46 are highest at the ends of the extensions 420, 421, 430 and 431 and progressively lower toward their centers to form V-shaped inclined surfaces on which the lower idlers 60 roll.

Figure 15:
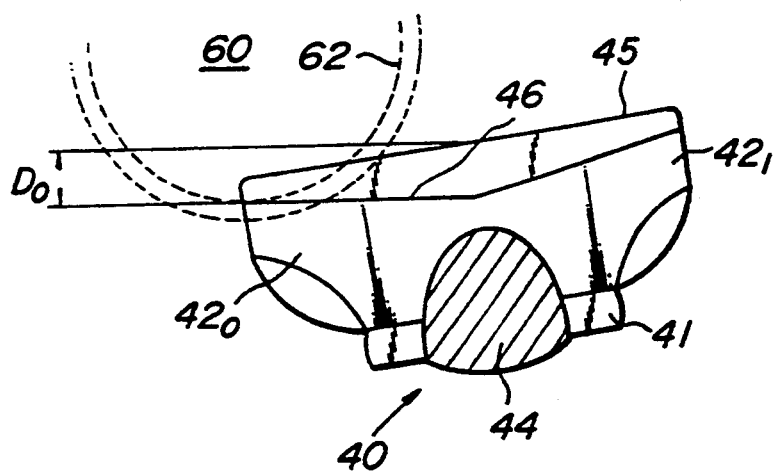
FIG. 15 is a sectional view illustrating the metallic core of FIG. 14, on which a lower idler has just ridden.

FIG. 15 is a cross-sectional view at the center of the metallic core, illustrating a lower idler 60 in phantom lines which has just ridden on the end of the lower top surface 46 formed on the extension 420 or 430 of the metallic core shown in FIG. 14. At the moment, the weight of a vehicle acts upon the end of the lower top surface 46 so that the metallic core 40 tilts to the left viewed in FIG. 15. The sunk distance $D_0$ of the lower idler 60 becomes comparatively large.

Figure 16:
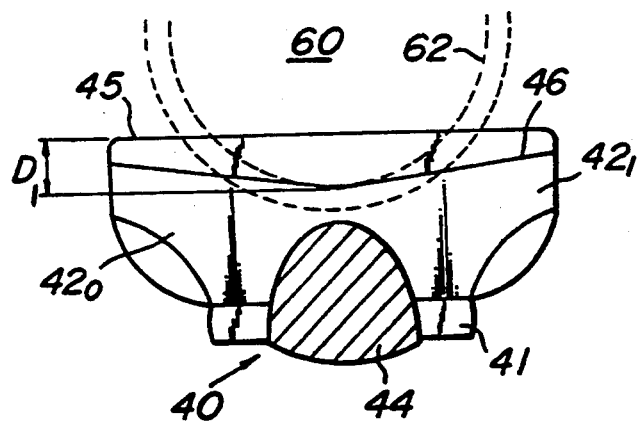
FIG. 16 is a sectional view illustrating the metallic core of FIG. 14, on which the lower idler has arrived at the center thereof.

When the lower idler 60 has become at the center of the metallic core 40 as shown in FIG. 16, the weight of the vehicle acts upon the metallic core 40 uniformly so that the inclination of the core disappears. Therefore, the sunk distance of the lower idler 60 becomes smaller or the lower idler 60 is to be raised. However, because the lower top surfaces 46 are V-shaped surfaces, when the lower idler 60 just arrives at the center of the lower top surfaces 46, the lower idler 60 is to be lowered so that the lower idler 60 is maintained at substantially the same level without vertical movement. When the lower idler 60 arrives at the other end of the protrusions, the metallic core 40 is tilted onto the side opposite to that shown in FIG. 15 and the sunk distance $D_1$ becomes larger similar to that $D_0$ shown in FIG. 15.

As can be seen from the above explanation, when the lower idler 60 rolling on the lower top surface is at the proximity of the extensions of the protrusions of the metallic core 40, the sunk distance of the lower idler 60 becomes larger due to the tilting of the metallic core 40, while when the lower idler 60 is at the substantial center of the protrusions, the sunk distance of the lower idler 60 becomes larger owing to the bottom of the particular shape of the lower top surfaces, but the sunk distance due to inclination of the metallic core disappears. Consequently, when the lower idler 60 is rolling on the lower top surfaces 46 of the metallic core 40, the sunk distance is maintained substantially unchanged. Therefore, the upward and downward movements of the lower idler 60 are reduced and vibrations due to such movements are also reduced.

As described above, according to this embodiment the rolling surfaces of the metallic core for upper and lower idlers are functionally divided to provide exclusive rolling surfaces for them, respectively. The lower top surfaces 46 may be of various shapes other than the V-shaped surfaces. For example, the flat surfaces are joined by smoothly curved surfaces to form a wholly rounded V-shaped surface as shown in FIG. 17 which is a central cross-sectional view illustrating the eighth embodiment of the invention. Moreover, the ends of the lower top surface at extensions 420, 421, 430 and 431 may be flat. FIG. 18 illustrates the ninth embodiment of the invention whose lower top surfaces 46 in the form of an inverted flat trapezoid have flat surfaces 48 at the center in addition to flat surfaces 47 at the ends.

FIG. 19 illustrates the tenth embodiment of the invention. In this embodiment, the lower top surface 462 of one protrusion 42 has a flat surface 471 at the extension 420, a downward inclined surface 49 adjacent the flat surface 471 and a flat surface 472 at the extension 421 adjacent the downward inclined surface 49. On the other hand, the lower top surface of the other protrusion 43 has a flat surface 473 at the extension 430 corresponding to the extension 420 at a level substantially the same as that of the flat surface 472, an upward inclined surface 49 and a flat surface 474 at a level substantially the same as that of the flat surface 471 as shown in broken lines. With this embodiment, the same effect as in the preceding embodiment is obtained although the lower idler 60 rolls on the lower top surfaces 46 with slightly swinging on both the sides of the longitudinal direction of the rubber truck. In such a case, the flat surfaces 471, 472, 473 and 474 may of course be merged with each other to form a smoothly curved surface.

FIG. 20 illustrates in a perspective view a metallic core of the eleventh embodiment of the invention, whose extensions 720 and 731 of protrusions 72 and 73 extend alternately in opposite directions beyond the wing portions 71, which are different from those in the embodiment shown in FIG. 14. In this embodiment, likewise, the upper top surfaces 75 are flat for rolling the upper idlers, while the lower top surfaces 76 are V-shaped surfaces for rolling the lower idlers.

Even with this metallic core, the lower top surfaces 76 may be various shapes as described above. A further example is shown as the twelfth embodiment in FIG. 21 which is a cross-sectional view of a metallic core taken along the center of the engaging portion. In this embodiment, the lower top surface 76 of one protrusion 72 has a flat surface 781 at the extension 720, a downward inclined surface 79 and a flat surface 782. On the other hand, the lower top surface of the other protrusion 73 has a flat surface 783 at a level substantially the same as that of the flat surface 782, an upward inclined surface 79 and a flat surface 784 at the extension 731 at a level substantially the same as that of the flat surface 781 as shown in broken lines.

While the lower idler rolling between pairs of protrusions is explained in the above embodiment, the invention is not limited to such a case. The invention is applicable to the case where the lower idler is rolling on the outer sides of the pairs of protrusions, as shown in FIG. 22 illustrating the thirteenth embodiment of the invention. In this embodiment, the protrusions 82 of the metallic core 80 are formed with upper top surfaces 85 for rolling the upper idlers on the sides of the engaging portion 84 and with lower top surfaces 86 for rolling the lower idlers on the side of the wing portions 81. The same effect can be obtained in this embodiment.

As can be seen from the above description, according to the above embodiments the rolling surfaces for upper and lower idlers are divided by their functions to provide top surfaces commensurate with the upper and lower idlers, respectively. As a result, vibrations and strange sounds caused by the rolling of the upper idlers are considerably reduced, and upward and downward movements of the lower idlers caused by the rolling thereof are mitigated to decrease vibrations to be transmitted to a personnel. With the arrangement according to the embodiments, moreover, the lower idlers contact the protrusions of the metallic cores in a deep fitted relationship to contribute to prevention of the idlers from getting off the rubber track.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A rubber track having a metallic core comprising; wing portions extending on both sides of the core to be embedded in an elastic member of the rubber track in width directions thereof, a sprocket engaging portion at the center of the core for engaging a driving sprocket, and a pair of protrusions provided on both sides of the sprocket engaging portion and projecting from the inner circumferential surface of the rubber track, each of the protrusions provided with at least one extension extending in the longitudinal direction of the rubber track, and top surfaces at the extension and at the center of the protrusion for rolling an idler thereon being connected to each other by a surface gently inclined downward toward the center of the protrusion.

2. The rubber track as set forth in claim 1, wherein each of the protrusions of the metallic core is provided with an extension extending in the longitudinal directions opposite to each other.

3. The rubber track core as set forth in claim 1, wherein the top surfaces at the extensions are higher than the top surfaces at the centers of the protrusions substantially by a sunk distance of an idler rolling on the protrusions when the idler has ridden on the extensions.

4. The rubber track core as set forth in claim 2, wherein the top surfaces at the extensions and at the centers of the protrusions are flat surfaces and the inclined surfaces are also flat surfaces.

5. The rubber track as set forth in claim 2, wherein the top surfaces at the extensions and at the centers of the protrusions are flat surfaces and the inclined surfaces are slightly curved surfaces.

6. The rubber track as set forth in claim 2, wherein the top surfaces at the extensions and at the centers of the protrusions are flat surfaces and connected by concaved surfaces.

7. The rubber track as set forth in claim 2, wherein the top surfaces at the extensions and at the centers of the protrusions are connected by V-shaped flat surfaces.

8. The rubber track as set forth in claim 2, wherein the top surfaces at the extensions and at the centers of the protrusions are connected by V-shaped flat surfaces, and the V-shaped flat surfaces are shifted from each other in the longitudinal direction of the rubber track.

9. The rubber track as set forth in claim 2, wherein the top surfaces at the extensions and at the centers of the protrusions are connected by V-shaped flat surfaces having flat bottoms, respectively.

10. The rubber track as set forth in claim 1, wherein the protrusions are provided on both the ends with extensions, and said protrusions are formed with shoulders along their longitudinal directions and in symmetry with each other to form upper top surfaces for an upper idler and lower top surfaces for a lower idler, the lower top surfaces at the extensions are higher than those at the centers of the protrusions.

11. The rubber track as set forth in claim 10, wherein said lower top surfaces are formed on the inner side of the upper top surfaces.

12. The rubber track as set forth in claim 10, wherein said lower top surfaces are formed on the outer side of the upper top surfaces.

13. The rubber track as set forth in claim 10, wherein said lower top surfaces are highest at the ends and progressively lower toward their centers to form V-shaped inclined surfaces.

14. The rubber track as set forth in claim 10, wherein the lower top surfaces are joined by smoothly curved surfaces to form a wholly rounded V-shaped surfaces.

15. The rubber track as set forth in claim 10, wherein the lower top surfaces are in the form of an inverted flat trapezoid having flat surfaces at the centers and flat surfaces at the ends.

16. The rubber track as set forth in claim 10, wherein said the lower top surface of the one protrusion includes a first flat surface at the first extension, a downward inclined surface adjacent the first flat surface and a second flat surface at the second extension adjacent the downward inclined surface, and the lower top surface of the other protrusion includes a first flat surface at the extension corresponding to said first extension at a level substantially the same as that of the second flat surface, a downward inclined surface adjacent the first flat surface and a second flat surface adjacent the upward inclined surface at the other extension corresponding the second extension.

17. The rubber track as set forth in claim 10, wherein the upper top surfaces of the protrusions for the upper idler are flat except chamfered portions thereof.

18. The rubber track as set forth in claim 1, wherein said protrusions are provided with one extensions, respectively, extending in opposite directions to each other, and said protrusions are formed with shoulders along their longitudinal directions and in symmetry with each other to form upper top surfaces which are flat for an upper idler and lower top surfaces for a lower idler, the lower top surfaces at the extensions are higher than those at the centers of the protrusions.

19. The metallic core as set forth in claim 1, wherein said protrusions are provided with one extension, respectively, extending in opposite directions to each other, and said protrusions are formed with shoulders along their longitudinal directions and in symmetry with each other to form upper top surfaces which are flat for an upper idler and lower top surfaces for a lower idler, the lower top surface of each of the protrusions includes a flat surface at the extension, a downward inclined surface adjacent the flat surface and a flat surface adjacent the downward inclined surface.

* * * * *